Patented Sept. 14, 1937

2,092,943

UNITED STATES PATENT OFFICE 2,092,943

PROCESS FOR PRODUCING IMPROVED DETERGENTS

Hans G. Vesterdal, Elizabeth, N. J., assignor to Standard Oil Development Company, a corporation of Delaware No Drawing. Application December 30, 1933, Serial No. 704,790

10 Claims. (Cl. 260—99.12)

This invention relates to an improved method for preparing detergents and wetting agents of high quality and more particularly to an improved method for substantially decreasing or preventing decomposition, odor formation, and other undesirable reactions in the preparation of such products.

It has been observed that many soaps, that is, compounds of organic acids of high molecular weight with bases, are unstable on heating even to moderately elevated temperatures such as those desirable for drying. This decomposition is often evidenced by lower yields of the desired product and the development of objectionable colors and odors during the drying operation.

Detergents containing organic derivatives of strong mineral acids, such as the phosphates, sulphates and sulphonates of high molecular weight with hydroxy alkyls, such as the fatty alcohols, hydroxy acids, and of olefinic compounds of similar molecular weights, containing from about 8 or 10 to 18, 20, 30 or more carbon atoms, often show indications of decomposition, even in ordinary drying operations. The detergents of sulphuric acid derivatives of cracked paraffins of high molecular weight, such as petrolatum and paraffin wax, can, in fact, be dried without decomposition only with extreme difficulty, substantial losses and blackening of the products resulting on heating at temperatures even of 212° F. to 140° F. Some of these detergents have been found to be unstable at even lower temperatures. Halogenated derivatives of these detergents, such as the chlor-fatty acid soaps, and the chlor-sulfo detergents derived from chlorhydrins of high molecular weight olefines, by reaction with sulfuric acid, also undergo decomposition on moderate heating. The preparation of such detergents is described in copending application Serial No. 689,564, filed September 15, 1933 by Hyym E. Buc.

It has now been found that the decomposition of these detergents may be greatly decreased and that dry soaps of high purity may be obtained if the drying operation is conducted in the presence of an excess of a suitable basic compound. Among such bases are the hydroxides and carbonates of the alkali and alkaline earth metals and ammonium, also ammonia and organic bases, such as the amines, hydroxy alkyl amines, and the like. Preferred bases are those capable of forming water soluble or readily dispersible compounds with the mineral acid component of the detergent. The use of ammonia is particularly preferred because it is thereby possible to obtain as finished products, dry detergents of high purity and substantial neutrality which are free from any appreciable excess of bases injurious to delicate textiles or the skin.

This invention is illustrated by the following example:

Petrolatum is subjected to destructive distillation at atmospheric pressure. 645 grams of the resulting cracked distillate boiling up to 600° F. are chilled to a temperature of 0 to 10° F. and 200 grams of fuming sulphuric acid containing 20% sulphuric anhydride are then added slowly with agitation during about one-half hour, with constant cooling to maintain the temperature throughout within the stated range. The reaction mixture is then neutralized by the slow addition of a 20% solution of aqueous caustic soda. The temperature of the mixture is maintained below about 15° F. until sufficient caustic soda has been added to neutralize about one-quarter of the total acid used and the temperature is then allowed to rise to about room temperature. 500 cc. of 91% strength aqueous isopropyl alcohol are added at a sufficient rate to prevent solidification during the neutralization step. The mixture is then allowed to stand and separates into three layers, an upper oily layer consisting of unreacted hydrocarbons, a middle alcohol layer containing most of the detergent, and a lower aqueous solution of inorganic salts. The middle alcohol layer is separately withdrawn and is mixed with 300 cc. of additional alcohol to throw out dissolved inorganic salts, which are removed by filtration.

A part of this detergent solution is then dried slowly on a hot plate at a maximum temperature of about 225° F. The solution develops strong acidity even while still liquid, and grows progressively darker, finally leaving a black sticky residue of a detergent of very poor quality.

A second portion of the same detergent solution is made alkaline by the addition of aqueous ammonia and is then evaporated under the same conditions as before, additional ammonia being added as necessary in order to maintain the mixture continually alkaline until it becomes solid. There is thus obtained a dry light-colored detergent having no objectionable stickiness and which is white in powdered form or in thin layers.

This detergent solution made alkaline with a suitable base such as ammonia, may also be dried without appreciable discoloration or decomposition by the use of a rotating drum drier with a steam pressure up to 30 to 40 pounds per square inch within the drum, and even higher pressures may be used.

Another suitable method of preparing the dry detergents without discoloration or decomposition is to mix the alkaline detergent solution in the form of a finely divided spray with hot gases such as air, in a spray drier. The hot gases may also be used to break up the liquid into the form of spray. The temperature of the gases used for spray drying may be suitably about 300 to 450 or 500° F.

The ammonia used in the above example may be partially or completely replaced by sodium or magnesium carbonate, hydroxide, oxide or other bases. The drying operation may be conducted under vacuum or by evaporation on drum dryers, spray driers, or other procedure commonly used in this art.

This invention applies to the heating of detergents generally to temperatures at which decomposition is appreciable, for purposes of milling, moulding and the like as well as to drying operations.

The detergents of sulphuric acid derivatives of cracked paraffins described in the above example, are no part of the present invention but are claimed in the copending application, Serial No. 704,749, filed by William J. Sweeney, on December 30, 1933.

The preferred detergents are formed by cracking petrolatum or paraffin wax under conditions avoiding the formation of polymerization and condensation products, treating fractions of suitable molecular weight range of the resulting unsaturated product with fuming sulfuric acid at a temperature below about 40° F., and preferably at a temperature below about 10 to 20° F., separating the sulfuric acid derivatives from contact with strong sulfuric acid (of above about 50% to 60% strength) without rise in temperature, neutralizing the sulfuric acid derivatives with a suitable base capable of forming water soluble compounds therewith, such as sodium or potassium carbonate or hydroxide or ammonia, and separating the detergents from unreacted hydrocarbons. The method of conducting the acid treating and neutralizing steps is claimed in the copending application, Serial No. 728,770, filed June 2, 1934, jointly by Stewart C. Fulton and the present applicant.

This invention is not to be limited by any theoretical explanations or examples, which have been presented herein solely for purposes of illustration, but only by the following claims in which it is desired to claim all novelty insofar as the prior art permits.

I claim:

1. In the preparation of improved detergents from substantially neutral salts of an organic derivative of a strong polybasic mineral acid, involving drying by heating an aqueous composition of said salt to temperatures at which decomposition is appreciable, a method for decreasing said decomposition and reducing discoloration comprising conducting said heating operation in the presence of an excess of ammonia.

2. Method according to claim 1, in which said salt is an organic derivative of sulphuric acid.

3. Method according to claim 1, in which said salt comprises a compound of a base with an alkyl sulphate.

4. Method according to claim 1, in which said salt comprises a sulphuric acid derivative of a cracked paraffin not lighter than petrolatum.

5. Method according to claim 1, in which said salt comprises a sulphuric acid derivative of cracked paraffin wax.

6. Method for preparing improved detergents comprising reacting a cracked high molecular weight paraffin with fuming sulphuric acid at a temperature below about 40° F. decreasing the free acid strength of the reaction mixture to below about 60% while maintaining said mixture below about 40° F. neutralizing the resulting sulphuric acid derivatives of cracked wax with a base capable of forming water soluble compounds therewith, forming an aqueous solution of the resulting compound, adding to said solution an excess of ammonia and drying said compound while continuously maintaining an excess of ammonia therein.

7. Process according to claim 6, in which said drying operation is conducted at a temperature below about 225° F.

8. Process according to claim 6, in which said drying operation is conducted at a temperature below about 140° F.

9. Process according to claim 6, in which said solution is dried by being spread in a thin layer on a rotating heated surface.

10. Process according to claim 6 in which said solution is dried by subjection in a finely divided form to contact with hot gases.

HANS G. VESTERDAL.